2,868,753

HYDRAULIC CEMENT COMPOSITIONS CONTAINING ACRYLAMIDE-ACRYLIC ACID COPOLYMERS AND METHOD OF MAKING SAME

Russell L. Morgan, Riverside, and Edwin R. Kolodny, Stamford, Conn., assignors to American Cyanamid Company, New York, N. Y., a corporation of Maine No Drawing. Application July 3, 1956
Serial No. 595,581

5 Claims. (Cl. 260—29.6)

This invention relates to the improvement of cement compositions, including neat hydraulic cements and concretes containing both cement and aggregate, to reduce the loss of fluids therefrom and to control their setting and hardening times by the incorporation therein of improved fluid loss-controlling agents as will be hereinafter more fully described.

The invention will be described and illustrated with particular reference to the Portland cement of commerce. This is made by mixing and grinding a calcareous material such as limestone or chalk with an argillaceous one such as clay or shale containing $Al_2O_3 \cdot SiO_2$ at about 1350°–1800° C. until it begins to vitrify. The clinker so produced is pulverized, mixed with some 2% of gypsum, and ground to about 200 mesh. The composition usually contains about 62–67% by weight of CaO, 18–20% of $Al_2O_3$, usually some 2–3% of Fe and about 1–4% of Mg together with traces of impurities. Neat cement, hereinafter sometimes referred to simply as cement or hydraulic cement, is made by mixing this material with water in proportions such that the mixture contains from 40% to about 80% by weight of water. Concrete is made by mixing the cement and water with an aggregate such as sand and gravel, a typical formula being 1 part by weight of cement, 2 parts sand and 4 parts of gravel using 6 gallons of water for each 100 lbs. of cement. It will be understood that the principles of the invention are equally applicable to hydraulic cements other than Portland cement, including generally mixtures of lime, silica and alumina containing dicalcium and tricalcium silicates along with alumina, iron oxide and the like.

Neat cements are used for a number of purposes where it is necessary to pump the cement-water slurry to an underground site. Typical examples are the cementing of deep oil and gas wells and the grouting of subterranean foundations and the like. Loss of fluids from the cement is often a serious problem in these operations, particularly when it is put under considerable hydrostatic pressure. It is a particular object of the present invention to provide a cement wherein the loss of fluids during such operations is greatly reduced or retarded.

The thickening and setting times of the cement are another important factor. It is of course desirable to keep the cement mixture fluid and pumpable while it is being delivered to its site, and a number of set-retarding materials have been proposed for this purpose; however, excessive delay after the cement has been placed is undesirable. It is a further important object of the invention to provide a class of fluid loss-controlling reagents having no marked delaying action on the setting time of cement and which can, if desired, be used in conjunction with other fluid loss-controlling reagents to compensate their set-retarding properties.

We have found that the above and other objects are accomplished when acrylamide-acrylic acid copolymers of medium to high molecular weights and containing certain critical ratios of acrylamide to acrylic acid are incorporated into cements in the form of their alkali metal salts. Although neither sodium polyacrylate nor polyacrylamide, taken alone, will reduce the fluid loss of aqueous hydraulic cement slurries to the degree required for commercial usefulness we have found that the alkali metal salts of copolymers of from 90 to about 70 mol percent of acrylamide with from 10 to about 30 mol percent of acrylic acid and having molecular weights above about 150,000 are effective fluid loss-controlling reagents for cement. Our invention in its broadest aspects therefore consists in the incorporation into aqueous cement slurries of fluid loss-controlling proportions of these copolymers after partial or complete conversion to their alkali metal salts, with or without the addition of other conditioning reagents such as sodium silicate, bentonite, carboxymethyl hydroxyethyl cellulose and the like.

The quantities of alkali metal acrylamide-acrylic acid copolymers to be incorporated into the cement in accordance with our invention will depend on whether they are used alone or in admixture with other fluid loss-controlling reagents such as carboxymethyl hydroxyethyl cellulose and on the degree of fluid loss control and final setting times desired in the cement. When the acrylamide-acrylic acid copolymer salts are used as the only fluid loss-control agent, quantities of about 0.3% to 5% on the dry weight of the cement constitute an optimum range. When other fluid loss-controlling reagents are also used, the minimum quantity of alkali metal acrylamide-acrylic acid copolymer may be as little as 0.1%. For example, from 0.1% to 0.5% of the sodium salt of a copolymer of 90 mol percent of acrylamide with 10 mol percent of acrylic acid having a molecular weight of about $2-5 \times 10^5$ in admixture with 0.1%–0.8% by weight of carboxymethyl hydroxyethyl cellulose, based on the dry weight of the cement, may be used.

The copolymers used in practicing our invention are preferably prepared by mixing monomeric acrylamide and acrylic acid in water in the proper proportions to obtain a copolymer containing from 90 to about 70 mols of combined acrylamide and 10 to about 30 mols of combined acrylic acid, adding a polymerization initiator such as ammonium persulfate and heating the mixture until the desired degree of copolymerization has been obtained. The solution is then cooled and converted to an alkali metal salt by addition of sodium hydroxide, potassium hydroxide or other alkali metal hydroxide to a final pH of from about 5 to 7 or slightly higher. For example, a mixture of 88 grams of acrylamide and 12 grams of acrylic acid in 125 grams of water is prepared in one vessel and a solution of 0.25 gram of ammonium persulfate in 225 grams of water in another vessel. A reaction flask is charged with 550 parts of water, heated to 70° C., and the two solutions are added separately and in equal amounts; the first addition being about 45 grams of each solution and the remainder being introduced in 30-gram portions at 5 minute intervals. The reaction flask is maintained at about 70°–80° C. for a total of about 4 hours, or until a copolymer having a molecular weight in excess of about 150,000 and preferably between 200,000 and 500,000 is obtained. If desired the polymerization can be continued until copolymers having molecular weights of 1,000,000 or more are obtained, since we have found that satisfactory results are obtainable with these high polymers despite the increase in viscosity that accompanies the high molecular weight. The charge is preferably cooled to about 30°-35° C. and adjusted with aqueous sodium hydroxide solution to a pH of about 6.5-7.

In addition to the acrylamide-acrylic acid copolymers of the molar ratios described above we have tested a number of other copolymers of different acrylamide: acrylic acid ratios and samples of sodium polyacrylate and partially hydrolyzed polyacrylamides and polyacrylonitriles, all as their sodium salts, as well as samples of polyacrylamide. Most of these materials were tested several times, but commercially useful results were not obtained. In most of the tests the cement ran dry almost immediately after it was placed under pressure, all of the free water being lost. In one or two isolated cases water loss values of less than 20 cc. for a 200-225 cc. sample of cement were obtained, which is within the range of commercial utility, but could not be obtained again when the test was repeated. Even partially hydrolyzed polyacrylamides, which would seem to be chemically similar to acrylamide-acrylic acid copolymers, gave erratic and for the most part useless results. The alkali metal salts of the copolymerization products of from 90 to 70 molar proportions of acrylamide with from 10 to about 30 molar proportions of acrylic acid, when of suitably high molecular weight, therefore constitute an exceptional and unusual class of linear carbon chain polymers, since they impart a consistently high degree of fluid loss control to aqueous cement mixes when incorporated therein in the proper amounts Our invention will be further described and illustrated by the following examples to which, however, it is not limited.

EXAMPLE 1

The fluid loss of cement-water slurries is determined by the same procedure that is used for measuring the water loss of drilling muds as described in A. P. I. Bulletin R. P. 29 (May 1950). A pressure filter is used containing a cylinder of 3 inches internal diameter and a height of at least 2½ inches fitted with a cap having a hole for the pressure medium and a bottom screen supporting a 325 mesh wire screen or a sheet of 9 cm. filter paper. The filter area is 7 square inches. A sample of the cement slurry under test, usually about 200-225 cc. in volume, is filled into the cylinder, a pressure of 100 lbs. per sq. inch of nitrogen gas is applied and the volume of filtrate obtained during the test period is measured.

The results obtainable with this equipment and the effect of density, temperature and other factors is described by Bergman, Hurley and Shell in the September 1955 issue of "World Oil," pages 99-102, using cements containing carboxymethyl hydroxyethyl cellulose as the fluid loss-controlling reagent.

Hydraulic cement slurries were prepared by mixing 200 grams of screened Portland cement with 150 cc. of water containing the acrylamide-acrylic acid copolymer sodium salt under test, agitated vigorously for 1 minute and tested for fluid loss under 100 p. s. i. at room temperature. The density of the cement was 13.3 lbs. per gallon. A copolymer of 90 mol percent of acrylamide and 10 mol percent of acrylic acid having a molecular weight of approximately 400,000 was used in proportions of from 0.375% to 3% on the dry weight of the cement. The samples were maintained under pressure in the test filter for 30 minutes and the quantity of filtrate, expressed in cubic centimeters, is shown in the following table.

Table 1

| Percent copolymer salt: | 30 min. fluid loss, ml. |
| --- | --- |
| 0.375 | 21.5 |
| 0.5 | 18 |
| 0.75 | 14 |
| 1.0 | 11 |
| 1.5 | 7 |
| 2.0 | 5 |
| 3.0 | 2.5 |
| None (Control) | 90 in 0.5 min. |

Sodium salts of other copolymers having acrylamide: acrylic acid ratios within the range of from 90:10 to 70:30 and molecular weights of about 200,000 to 500,000 were added to cement slurries of the same density in quantities of 1.5% on the dry weight of the cement and the compositions were tested at room temperature with the following results.

Table 2

| Acrylamide:acrylic mol ratio: | 3 min. fluid loss, ml. |
| --- | --- |
| 90:10 | 7.2 |
| 80:20 | 12.5 |
| 70:30 | 18.3 |

These results show that the fluid loss of hydraulic cements can be controlled effectively by incorporating therein alkali metal salts of copolymers of from 90 to 70 mols of acrylamide with from 10 to 30 mols of acrylic acid.

EXAMPLE 2

In order to determine the effect of molecular weight of the acrylamide-acrylic acid copolymers a series of tests was made in the equipment of Example 1 using a Portland cement-water mixture having a density of 13.3 lbs. per gallon. In all cases 1.5% of the additive on the weight of the cement was used and the slurry was agitated for one minute and tested.

Copolymers of 90 mol percent of acrylamide and 10 mol percent of acrylic acid having molecular weights in the range from about 100,000 to 1,000,000 were used as their sodium salts. The 30-minute fluid losses were as follows:

| Copolymer mol. wt.: | 30 min. fluid loss, ml. |
| --- | --- |
| 100,000 | 24.5 |
| 200,000 | 9.5 |
| 300,000 | 8.0 |
| 400,000 | 7.0 |
| 510,000 | 7.0 |
| 950,000 | 6.5 |

These figures show that for commercially acceptable results (not more than 20 ml. fluid loss on the test) a copolymer having a molecular weight greater than about 100,000 should be used. They also show, however, that any copolymer having a molecular weight greater than about 150,000 can be used with success, only a small improvement being obtained as the degree of polymerization increases above this figure.

EXAMPLE 3

The results tabulated below were obtained with copolymers of acrylamide and acrylic acid in molar proportions different from the 90:10 to 70:30 range and with polyacrylamide and sodium salts of hydrolyzed polyacrylamides and polyacryonitriles of comparable molecular weights. The cement used was a mixture of equal weight of Portland cement and water which was stirred for one minute before testing; the quantity of additive used is based on the dry weight of the cement. The test results show that commercially useful results cannot be obtained either with partially hydrolyzed polyacrylamide or with the hydrolyzed polyacrylonitrile of commerce.

| Additive | Percent on Cement | Fluid Loss | Effect on Cement |
|---|---|---|---|
| 95:5 acrylamide-acrylic acid copolymer, mol. wt. 400,000 | 1.5 | Ran dry <1 min. (68 ml.) | Remained fluid. |
| Do | 3.0 | do | Do. |
| 60:40 acrylamide-acrylic acid copolymer, mol. wt. 400,000 | 0.76 | Ran dry in 5 min | Fluid; then thickened. |
| Do | 1.5 | 14 ml. in 30 min | Do. |
| 40:60 acrylamide-acrylic acid copolymer, mol. wt. 400,000 | 0.76 | Ran dry <1 min. (103 ml.) | Do. |
| Do | 1.5 | Ran dry 3 min. (64 nl.) | Do. |
| 20:80 acrylamide-acrylic acid copolymer, mol. wt. 400,000 | 0.76 | Ran dry <1 min. (97 ml.) | Do. |
| Do | 1.5 | Ran dry <1 min. (81 ml.) | Do. |
| polyacrylamide, mol. wt. 500,000 | 1.5 | Ran dry 2-4 min. (92-94 ml.) | Remained fluid. |
| Na polyacrylate, mol. wt. 250,000 | 1.5 | Ran dry 1 min. (58 ml.) | Do. |
| hydrolyzed polyacrylamides, mol. wts. about 200,000-400,000: | | | |
| (a) {Na acrylate:acrylamide 30:70 | 0.76 | Ran dry <1 min. (65 ml.) | Do. |
| Do | 1.5 | Ran dry 3-6 min. (65-85 ml.) | Do. |
| (b) Na acrylate:acrylamide 34:66 | 1.5 | 30-48 ml. in 30 min | Thickened. |
| 70% hydrolyzed polyacrylonitrile, made with (NH$_4$)$_2$S$_2$O$_8$ and NaHSO$_3$ catalyst; mol. wt. about 300,000. | 1.5 | Ran dry 10 sec. (47-80 ml.) | Remained fluid. |

What we claim is:

1. A cement composition of reduced fluid loss characteristics comprising an aqueous hydraulic cement slurry and, as a fluid loss-reducing agent therefor, about 0.3% to 5% on the dry weight of the cement of an alkali metal salt of a copolymer of from 90 to 70 mol percent of acrylamide and 10 to 30 mol percent of acrylic acid having a molecular weight of at least 150,000 and not less than that of a copolymer obtained by reacting a mixture of 88 grams of acrylamide and 12 grams of acrylic acid with 0.25 gram of ammonium persulfate in 900 grams of water at about 70°–80° C. for 4 hours.

2. A composition as defined in claim 1 in which the mol percent ratio of acrylamide to acrylic acid in the copolymer is 90:10.

3. A method of reducing fluid loss in aqueous hydraulic cement slurries which comprises incorporating therein about 0.3% to 5% on the dry weight of the cement of an alkali metal salt of a copolymer of from 90 to 70 mol percent of acrylamide and 10 to 30 mol percent of acrylic acid having a molecular weight of at least 150,000 and not less than that of a copolymer obtained by reacting a mixture of 88 grams of acrylamide and 12 grams of acrylic acid with 0.25 gram of ammonium persulfate in 900 grams of water at about 70°–80° C. for 4 hours.

4. A cement composition comprising a mixture of from 60 to 20 parts by weight of Portland cement and 40 to 80 parts by weight of water containing about 0.3% to 5% on the weight of the cement of a sodium salt of a copolymer of from 90 to 70 mol percent of acrylamide and 10 to 30 mol percent of acrylic acid having a molecular weight of at least 150,000 and not less than that of a copolymer obtained by reacting a mixture of 88 grams of acrylamide and 12 grams of acrylic acid with 0.25 gram of ammonium persulfate in 900 grams of water at about 70°–80° C. for 4 hours.

5. A composition according to claim 4 wherein the copolymer is a 90:10 acrylamide-acrylic acid copolymer.

References Cited in the file of this patent

UNITED STATES PATENTS

| | | |
|---|---|---|
| 2,614,998 | Lea | Oct. 21, 1952 |
| 2,625,529 | Hedrick et al. | Jan. 13, 1953 |
| 2,648,645 | Boris et al. | Aug. 11, 1953 |
| 2,650,905 | Fordyce et al. | Sept. 1, 1953 |